(12) United States Patent
Chitta et al.

(10) Patent No.: US 11,087,123 B2
(45) Date of Patent: Aug. 10, 2021

(54) TEXT EXTRACTION, IN PARTICULAR TABLE EXTRACTION FROM ELECTRONIC DOCUMENTS

(71) Applicant: KIRA INC., Toronto (CA)

(72) Inventors: Radha Chitta, Toronto (CA); Alexander Karl Hudek, Toronto (CA)

(73) Assignee: KIRA INC., Toronto (CA)

(*) Notice: Subject to any disclaimer, the term of this patent is extended or adjusted under 35 U.S.C. 154(b) by 122 days.

(21) Appl. No.: 16/550,224

(22) Filed: Aug. 24, 2019

(65) Prior Publication Data
US 2021/0056300 A1    Feb. 25, 2021

(51) Int. Cl.
*G06K 9/00* (2006.01)
*G06K 9/62* (2006.01)
*G06T 7/11* (2017.01)

(52) U.S. Cl.
CPC ..... *G06K 9/00449* (2013.01); *G06K 9/00469* (2013.01); *G06K 9/6256* (2013.01); *G06K 9/6262* (2013.01); *G06T 7/11* (2017.01); *G06K 2209/01* (2013.01); *G06T 2207/20081* (2013.01); *G06T 2207/20084* (2013.01); *G06T 2207/30176* (2013.01)

(58) Field of Classification Search
CPC ........... G06K 2209/01; G06K 9/00442; G06K 9/00456; G06K 9/00463; G06K 9/00449; G06K 9/6256; G06K 9/00469; G06N 3/08; G06N 3/0454
See application file for complete search history.

(56) References Cited

U.S. PATENT DOCUMENTS

| | | | |
|---|---|---|---|
| 8,254,681 B1* | 8/2012 | Poncin | G06F 40/20 382/180 |
| 2007/0009214 A1 | 4/2007 | Handley | |
| 2018/0003284 A1 | 1/2018 | Graf et al. | |
| 2019/0019052 A1 | 1/2019 | Pao et al. | |
| 2020/0320289 A1* | 10/2020 | Su | G06K 9/6256 |

OTHER PUBLICATIONS

Fang et al., "A Table Detection Method for Multipage Pdf Documents via Visual Seperators and Tabular Structures", International Conference on Document Analysis and Recognition, 2011, 1520-5363/11, pp. 1-5, IEEE Computer Society.

(Continued)

*Primary Examiner* — Ross Varndell
(74) *Attorney, Agent, or Firm* — Elan IP Inc.

(57) ABSTRACT

A method for extracting of data contained in a fixed format electronic document is disclosed. The method is particularly applicable to extracting data from tables in electronic documents and includes reading, by a computer system, the electronic document as a computer image file; segmenting, by the computer system, the computer image file into document sections representative of distinct portions of data; applying a label to each distinct document section; and executing, by the computer system, an optical character recognition algorithm to convert the image file into computer-readable text, wherein segments of the converted text is associated with a respective label indicative of each distinct document section.

12 Claims, 17 Drawing Sheets

(56) References Cited

OTHER PUBLICATIONS

Gilani et al., "Table Detection using Deep Learning", National University of Sciences and Technology (NUST), 2017, pp. 1-7, ResearchGate.

Krizhevsky et al., "ImageNet Classification with Deep Convolutional Neural Networks", Communications of the ACM, 2017, pp. 1-7, vol. 60 No. 6.

Long et al., "Fully Convolutional Networks for Semantic Segmentation", 2014, pp. 1-10.

Rumelhart et al., "Learning Representations by Back-Propagating Errors", Letters to Nature, 1986, pp. 533-536, vol. 323 9, pp. 533-536.

Zanibbi et al., "A Survey of Table Recognition: Models,Observations, Transformations, and Inferences", School of Computing, 2003, pp. 1-33.

\* cited by examiner

FIG. 1

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Provincial and territorial general governments, financial assets and liabilities, by province and territory
(Newfoundland and Labrador, Prince Edward Island, New Brunswick, Nova Scotia)

|  | 2008 Canada $ millions | N.L. $ millions | P.E.I. $ millions | N.B. $ millions | N.S. $ millions |
|---|---|---|---|---|---|
| Financial assets | | | | | |
| Cash on hand and on deposit | 6,570 | 455 | 35 | 48 | 86 |
| Receivables | 44,563 | 745 | 178 | 1,539 | 2,007 |
| Advances | 54,863 | 221 | 145 | 365 | 463 |
| Securities | 294,591 | 2,494 | 554 | 10,508 | 4,236 |
| Other financial assets | 2,464 | 49 | 24 | 101 | 12 |
| Liabilities | 644,415 | 11,930 | 2,260 | 18,749 | 17,519 |
| Bank overdrafts | 3,847 | 18 | 10 | 0 | 3 |
| Payables | 57,277 | 1,536 | 304 | 1,692 | 1,674 |
| Advances | 11,286 | 439 | 95 | 39 | 360 |
| Treasury bills | 11,365 | 494 | 125 | 712 | . |
| Savings bonds | 4,580 | 0 | | | |
| Bonds and debentures | 225,613 | 6,655 | 1,332 | 13,631 | 10,652 |
| Other securities | 144,022 | 0 | 127 | 0 | 1,704 |
| Deposits | 71,240 | 10 | 0 | 390 | . |
| Other liabilities | 33,263 | 1,330 | 136 | 2,274 | 2,772 |
| Net debt | 241,364 | 7,966 | 1,324 | 6,188 | 10,735 |

.. : not available for any reference period.
Note: Data are as at March 31.
Source: Statistics Canada, CANSIM, table (for fee) 385-0014.
Last modified: 2010-01026.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Provincial and territorial general governments, financial assets and liabilities, by province and territory
(Newfoundland and Labrador, Prince Edward Island, New Brunswick, Nova Scotia)

|  | 2008 Canada $ millions | N.L. $ mill. (PURPLE) | P.E.I. $ millions (CORAL) | N.B. $ millions (CORAL) | N.S. $ millions (CORAL) |
|---|---|---|---|---|---|
| Financial assets | | | | | |
| Cash on hand and on deposit | 6,570 | 455 | 35 | 48 | 86 |
| Receivables | 44,563 | 745 | 178 | 1,539 | 2,007 |
| Advances | 54,863 | 221 | 145 | 365 | 463 |
| Securities | 294,591 | 2,494 | 554 | 10,508 | 4,236 |
| Other financial assets | 2,464 | 49 | 24 | 101 | 12 |
| Liabilities (GREY) | 644,415 | 11,930 | 2,260 | 18,749 | 17,519 |
| Bank overdrafts | 3,847 | 18 | 10 | 0 | 3 |
| Payables | 57,277 | 1,536 | 304 (PINK) | 1,692 | 1,674 |
| Advances | 11,286 | 439 | 95 | 39 | 360 |
| Treasury bills | 11,365 | 494 | 125 | 712 | |
| Savings bonds (LIGHT GREEN) | 4,580 | 0 | | | |
| Bonds and debentures | 225,613 | 6,655 | 1,332 | 13,631 | 10,652 |
| Other securities | 144,022 | 0 | 127 | 0 | 1,704 |
| Deposits | 71,240 | 10 | 0 | 390 | |
| Other liabilities | 33,263 | 1,330 | 136 | 2,274 | 2,772 |
| Net debt | 241,364 | 7,966 | 1,324 | 6,188 | 10,735 |

.. : not available for any reference period.
Note: Data are as at LIGHT GREY.
Source: Statistics Canada, GREY e) 385-0014.
Last modified: 2010-01026.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

FIG. 4

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

| Provincial and territorial general governments, finanacial assets and liabilities, by province and territory (Newfoundland and Labrador, Prince Edward Island, New Brunswick, Nova Scotia) | 2008 Canada $ millions | N.L. $ millions | P.E.I. $ millions | N.B. $ millions | N.S. $ millions |
|---|---|---|---|---|---|
| Finanacial assets | 403,051 | 3,964 | 936 | 12,561 | 6,784 |
| Cash on hand and on deposit | 6,570 | 455 | 35 | 48 | 66 |
| Receivables | 44,563 | 745 | 178 | 1,539 | 2,007 |
| Advances | 54,863 | 221 | 145 | 365 | 483 |
| Securities | 294,591 | 2,494 | 554 | 10,508 | 4,236 |
| Other financial assets | 2,464 | 49 | 24 | 101 | 12 |
| Liabilities | 644,415 | 11,930 | 2,260 | 18,749 | 17,519 |
| Bank overdrafts | 3,847 | 18 | 10 | 0 | 3 |
| Payables | 57,277 | 1,536 | 304 | 1,892 | 1,674 |
| Advances | 11,286 | 439 | 95 | 39 | 360 |
| Treasury bills | 11,365 | 494 | 125 | 712 | . |
| Savings bonds | 4,580 | 0 | . | . | . |
| Bonds and debentures | 225,613 | 6,655 | 1,332 | 13,631 | 10,652 |
| Other securities | 144,022 | 0 | 127 | 0 | 1,704 |
| Deposits | 71,240 | 10 | 0 | 390 | 0 |
| Other liabilities | 33,263 | 1,330 | 136 | 2,274 | 2,772 |
| Net debt | 241,364 | 7,966 | 1,324 | 6,188 | 10,735 |

. : not available for any reference period.
Note: Data are as at March 31.
Source: Statistics Canada, CANSIM, table (for fee) 385-0014.
Last modified: 2010-01026.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

Lorem ipsum dolor sit amet, nonumes voluptatum met ea, cu case ceteros cum. Novum commodo malorum vix ut. Dolores consequuntur in ius, sale electram dissentiunt quo te. Cu duo omnes invidunt, cos cu mucius fabellas. Stet facilis ius te, quando voluptatibus cos in. Ad vix mundi alterum, integre urbanitas intellegam vix in.

FIG. 12

TEXT EXTRACTION, IN PARTICULAR TABLE EXTRACTION FROM ELECTRONIC DOCUMENTS

(1) FIELD OF THE INVENTION

The present invention generally relates to the field of extracting text in non-conventional form from electronic documents, and in particular to extracting data in table from scanned documents.

(2) BACKGROUND OF THE INVENTION

Tables present in portable document format (PDF) documents are used to compactly communicate important information in the form of rows and columns. These tables have varying layouts and positions, due to which it is challenging to design generic algorithms to detect and extract information from such tables. For example, tables may or may not have borders and the table cells may or may not be clearly separated from each other. Table headers present another particularly difficult constraint on existing solutions. Existing optical character recognition (OCR) techniques either assume a default document and table layout or employ heuristics to detect tables in PDF documents, thus limiting their capabilities and accuracy.

Various proposals have been presented, and algorithms experimented with in the prior art, but generally prior art solutions have one or more of the following shortcomings: (a) low accuracy; (b) techniques employing heuristics that are inherently dependent on some knowledge of the table and document structures.

(3) SUMMARY OF THE INVENTION

In one embodiment of the invention, there is disclosed a method for extracting of data contained in an electronic document, the method including reading, by a computer system, the electronic document as a computer image file; segmenting, by the computer system, the computer image file into document sections representative of distinct portions of data; applying a label to each distinct document section; executing, by the computer system, an optical character recognition algorithm to convert the image file into computer-readable text, wherein segments of the converted text is associated with a respective label indicative of each distinct document section.

In one aspect of the first embodiment, the data is one or more tables in the fixed format electronic document.

In another aspect of the first embodiment, the document sections include one or more selected from the group consisting of non-table text, table text, table row headers, table column headers, table footers and table cell text.

In another aspect of the first embodiment, the fixed format electronic document is a portable document format (PDF) document represented as images.

In another aspect of the first embodiment, the image data in the PDF document is of unknown layout.

In another aspect of the first embodiment, prior to the reading the method further comprises training the computer system using a data set of training documents on execution of the segmenting step.

In another aspect of the first embodiment, the training comprises processing the data set through a deep learning neural network.

In another aspect of the first embodiment, the deep learning neural network is a fully convolutional network.

In another aspect of the first embodiment, the fully convolutional network is configured to label each pixel in the image file, and pixels having a common label and grouped together to define the document sections.

In another aspect of the first embodiment, each labelled pixel is compared against the known label of the pixel during the training step to determine a loss value; wherein loss values are summed up for each document and the fully convolutional network trained using backpropagation to minimize total loss.

According to a second embodiment of the invention, there is disclosed a system for extracting of data contained in a fixed format electronic document, the system including a computer system processor executing computer readable instructions stored on a non-transitory computer readable medium configured to:
  read the electronic document as a computer image file;
  segment the computer image file into document sections representative of distinct portions of data;
  apply a label to each distinct document section;
  execute an optical character recognition algorithm to convert the image file into computer-readable text, wherein segments of the converted text is associated with a respective label indicative of each distinct document section.

In one aspect of the second embodiment, the data is one or more tables in the fixed format electronic document.

In another aspect of the second embodiment, the document sections include one or more selected from the group consisting of non-table text, table text, table row headers, table column headers, table footers and table cell text.

In another aspect of the second embodiment, the fixed format electronic document is a portable document format (PDF) represented as images.

In another aspect of the second embodiment, the image data obtained from the PDF document is of unknown layout.

In another aspect of the second embodiment, the computer readable instructions further include instructions to train the computer system using a data set of training documents on execution of the segmenting step.

In another aspect of the second embodiment, the training comprises processing the data set through a deep learning neural network.

In another aspect of the second embodiment, the deep learning neural network is a fully convolutional network.

In another aspect of the second embodiment, the fully convolutional network is configured to label each pixel in the image file, and pixels having a common label and grouped together to define the document sections.

In another aspect of the second embodiment, each labelled pixel is compared against the known label of the pixel during the training step to determine a loss value; wherein loss values are summed up for each image file and the fully convolutional network trained using backpropagation to minimize total loss.

(4) BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 depicts tables of different layouts in a PDF document.

FIG. 4 depicts the detection of table and indication of the parts of table using different colours.

FIG. 12 shows another example of source text.

(5) DETAILED DESCRIPTION OF THE INVENTION

Figure 2:
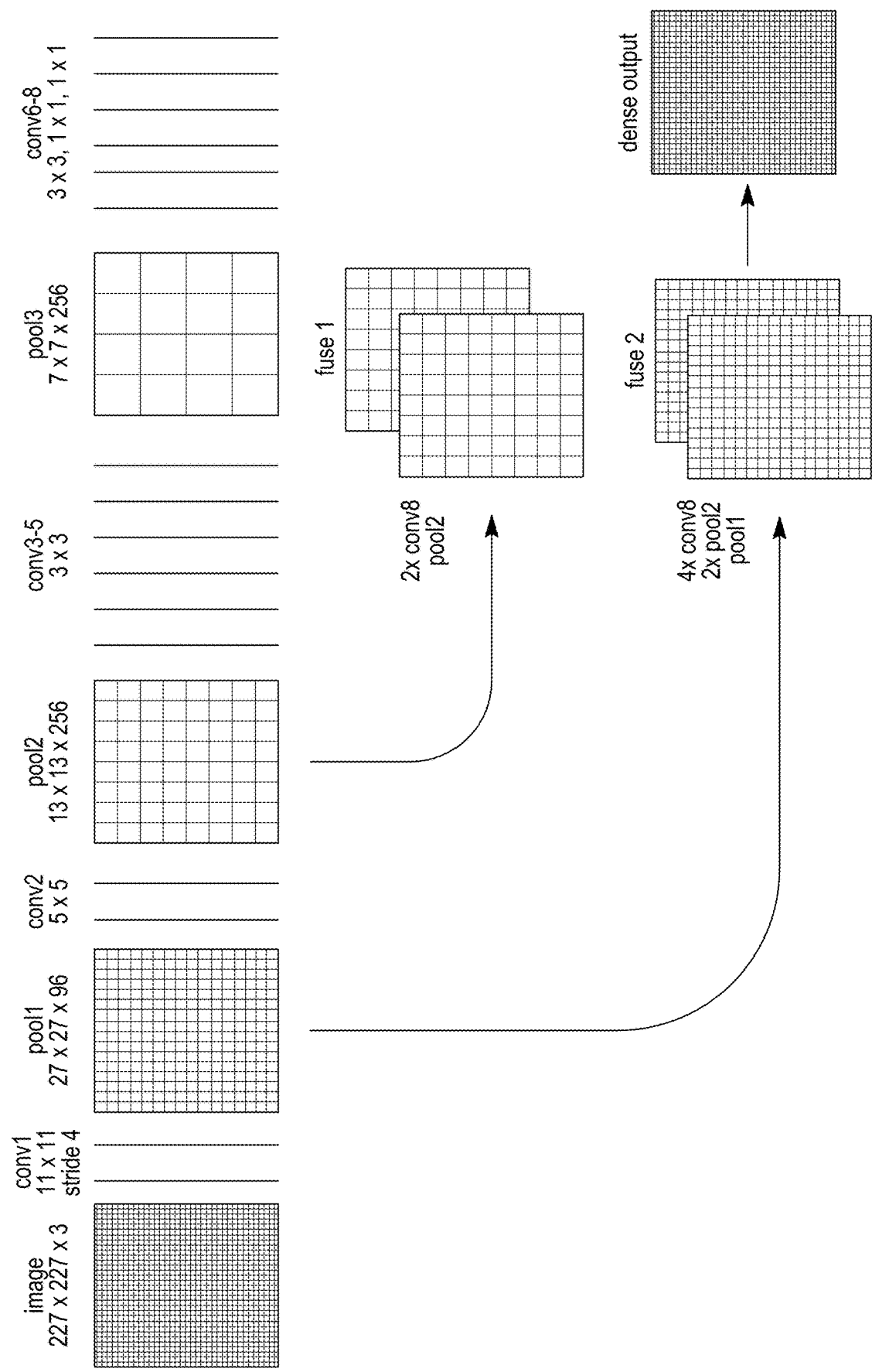
FIG. 2 depicts an exemplary fully convolutional network.

The present invention provides an improved technique to extract various types of information formatted and arranged differently than standard text from electronic documents. The description makes general reference to tables and information in tabular form, but the techniques can readily be applied to data in other forms, such as charts, graphs, text in different orientations, etc. The invention is most particularly applicable to extracting data from electronic documents which do not have table definitions built into them. One example of this type of document is a PDF document that must undergo a complete optical character recognition process. While reference is often made to PDF documents in this description, the invention is not limited to PDF documents and generally applies to any electronic document from which information is intended to be extracted via an optical character recognition (OCR) process.

For the purposes of this disclosure, an electronic document is defined as one existing in electronic form that cannot immediately be interpreted by a computer algorithm. Rather, the document initially appears as an image to the computer, and must then be subject to a computer implemented process to either interpret or extract particular information from the document. The term "document" explicitly excludes paper documents understood in their usual sense. Rather, a precondition of an electronic document in this disclosure is the requirement that a computer is used to interpret the document. The invention pertains to this problem of the manner in which computers are able to interpret or extract information from electronic documents that require an OCR process, or a similar process by which a computer program must assess the document in some manner. Given the vast amounts of data existing on paper that are being scanned for computer interpretation or data extraction, this problem has become a significant one in terms of processing power required and accuracy of information extracted from electronic documents. The present disclosure is directed specifically to the extraction of data in irregular text arrangements, and more specifically in tabular form.

Tables present in PDF documents often contain important information, or information highlighted for a particular purpose. These tables may have varying layouts and positions. Tables may or may not have borders and the table cells may or may not be clearly separated from each other. In many documents, the tables may be interleaved with the text in the document, without any clear demarcation. This variety in layout poses a problem to many existing Optical Character Recognition techniques which expect the document to be in a specific layout.

Existing OCR techniques either assume a default document and table layout or employ heuristics to detect tables in PDF documents, thus limiting their capabilities and accuracy. For example, consider the problem in a legal due diligence exercise where a significant number of contracts, drafted by different people for different purposes and not following a template need to be reviewed. It is extremely cumbersome for this type of review to be done manually. Machine learning, and other data extraction techniques have been employed in recent times to either extract specific portions of data (for example, all data falling under a particular heading) or to identify specific documents for manual review (for example, identifying all documents containing as specific term). More complex tools are able to determine sentence structure and extract various other types of data from within documents using artificial intelligence and more complex machine learning algorithms.

In this disclosure, the problem of detecting and extracting information from tables in PDF documents is treated as a problem of segmenting sections of documents into images representing different areas such as non-table text, table row headers, table column headers, table footers, and table cell text. The inventors propose a deep learning method which trains a deep learning neural network, hereinafter referred to as a Fully Convolutional Network to segment document images. The model learnt by this network can then be used to segment images of previously unseen PDF documents, and a standard OCR algorithm can be used to extract the information in these document segments.

The present invention ultimately uses an OCR technique to detect or extract tables present in a document requiring an OCR process (ie. a document containing scanned data, typically in image form). These documents are typically converted to PDF document prior to executing the invention, but this not necessary required. Before using the OCR algorithm to extract text from the image, the document is converted into document images. One approach for segmenting different portions of the document, and for ease of understanding and illustration, is to represent different portions of the document (in image form) with different colours. In practice, the document sections are encoded differently once the image has been segmented. With respect to the table problem these portions could be table headers, table text, non-table text, row headers, column headers, table footers and table cells.

It will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code is applied to input data to perform the functions described herein and to generate output information. The output information is applied to one or more output devices, in known fashion.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read-only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, nontransitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is only temporarily stored. The computer useable instructions may also be in various forms, including compiled and non-compiled code.

As a precursor to the steps involved in carrying out the invention, documents are imported into the system; or in the alternative, a computer storage device is scanned for electronic documents. Any hard copy documents are converted into an appropriate digital form, for example by scanning or creating a digital image. The digital form may be a commonly known file format.

Figure 1:
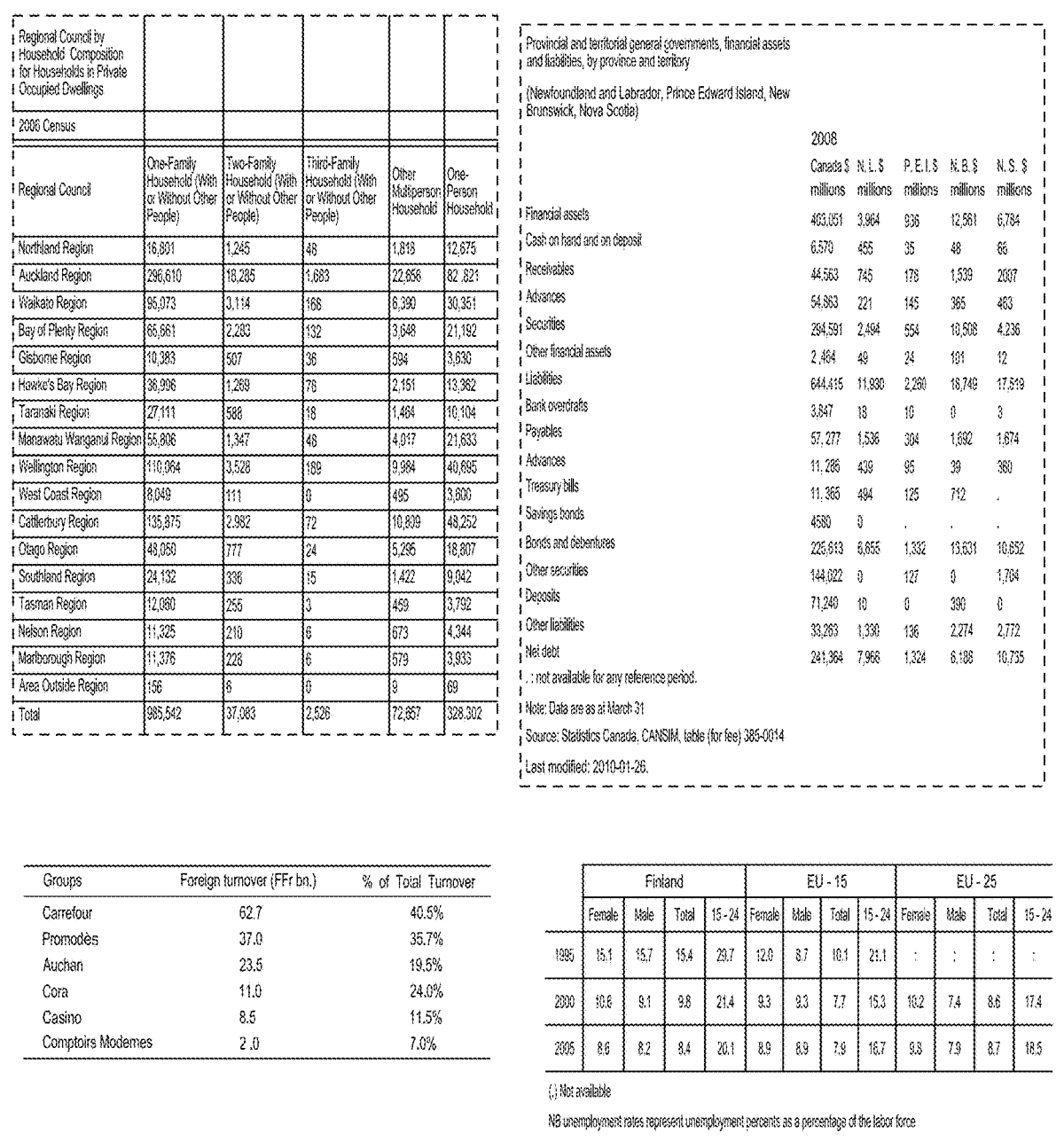

FIG. 1 depicts tables of different layouts in a PDF document. Surrounding text is not shown, but these tables could easily be positioned in line with other text in the document. A number of tables having different numbers of row and columns, different outline borders, some tables without any border, different table header, different row header, different columns header, different table footer and different arrangements of table cells. These tables cannot be extracted using prior art OCR techniques with a high degree of accuracy.

Prior art techniques which are capable of detecting the position of the tables despite varying layouts can only differentiate between the non-table text and the table text, and cannot demarcate between the table headers, the table text, non-table text, row header, column header, table footer and table cells. As a result, while it is possible to identify tables, it is not possible to either convert tables to useful documents that have completed an OCR process or to extract specific information from these tables with a high degree of confidence.

In the proposed method, a Fully Convolutional Network is proposed which is to segment images and identify objects within the images. The present invention trains this network with a large number of synthetically generated document images of varying document and table layouts, to demarcate the different areas of the table. Due to the large variety of documents presented to the network for training, the trained model is very versatile, and hence is more accurate than existing techniques in detecting and extracting the table data.

A Fully Convolutional Network is defined herein as a multi-layered neural network which takes as input image and performs a series of convolution and pooling operations on the image to obtain a unique non-linear representation for each local region on the image. The input image is represented as a size h×w×d, where h and w are the spatial dimensions and d is the channel dimension. The channel dimension is a variable representing the colourspace of the image. For example, for RGB images, d is 3 and for grayscale images, d is 1. The output of each layer in the network is represented by:

$$y_{ij} = f_{ks}(\{x_{si+\delta i, sj+\delta j}\} 0 \leq \delta i, \delta j \leq k),$$

where x is the input to the layer, $x_{ij}$ is the representation at the location (i; j), k is a kernel size, s is the stride of the array, and $f_{ks}$ is the operation corresponding to the layer.

The method or algorithm then up samples the image representation obtained in the final convolution layer through a series of de-convolution operations to predict a class label for each of the pixels in the image. A real-valued loss function is defined at each pixel, as the difference between the true class label and the predicted class label at the pixel. These individual loss values are summed up to define the loss for the network. The network is trained using a back propagation algorithm to minimize this total loss. An exemplary back propagation algorithm is described in David E Rumelhart, Geoffrey E Hinton, and Ronald J Williams. *Learning representations by back-propagating errors. Nature,* 323(6088):533-536, 1986.

An exemplary neural network is depicted in FIG. 2 which shows a fully convolutional network as contemplated for use in the invention. The network is, at least in part, based on the AlexNet network popularly used for image classification and object detection, described in Alex Krizhevsky, Ilya Sutskever, and Geoffrey E Hinton. *Imagenet classification with deep convolutional neural networks. In Advances in neural information processing systems,* pages 1097-1105, 2012. The network as modified for use in this invention consists of a series of convolution layers (labeled as conv1, conv2 . . . conv5) and max pool layers (labeled as pool1, and pool2). The output of the conv5 layer is first passed through a max pooling layer pool5, and then passed through a series of de-convolution layers (conv6, conv7, and conv8). The outputs of conv8 and pool2 are fused to produce a 16× up sampled version of the image representation, which is then fused with the output of pool1 to produce the pixel-wise class labels. The operation of the convolution, pooling and deconvolution layers is explained in detail below.

A convolutional layer consists of a set of K neurons that perform a non-linear operation on the input to automatically detect the presence of certain features (such as edges, curves and corners) in the input image. Each neuron is associated with a non-linear filter $f_k$. The input image is divided into small overlapping regions of size δi×δj, and each of the K filters is applied to this region, to produce a non-linear representation for the input image. The output of a convolutional layer is of the form $y_{ij} = f_{ks}(\{x_{si+\delta i, sj+\delta j}\}: 0 \leq \delta i, \delta j \leq k)$, where x is the input to the layer, $x_{ij}$ is the representation at the pixel (i, j), k is called the filter size, s the stride and $f_{ks}$ the operation corresponding to the layer. The most common convolutional operation involves multiplying the input with a set of weights W of size k×k, and applying the ReLU (rectified linear unit) function to the product: $y_{ij}$=[max $\{x_{si+\delta i, sj+\delta j} W_{ij}, 0\}$ 0≤δi, δj≤k]

The weights are learnt during the training phase using the backpropagation algorithm.

The pooling layers downsample the output of the convolutional layers to make the convolutional network less sensitive to the location of features. Each contiguous p×p region is replaced by the maximum value in the region. For an input $x_{ij}$, the output of the pool layer is $$y_{ij} = \max_{-p/2 \leq \delta_i, \delta_j \leq p/2} x_i + \delta_i, j + \delta_j.$$

The deconvolution layers upsample the input by performing the convolution operation backwards, i.e. switching the input and output of convolution. For instance, in order to upsample the input 32×, each of the input regions are padded with zeros and multiplied by the weights, whose size k is greater than the size of the input region. The stride of the convolution filter is set to 32.

Figure 3:
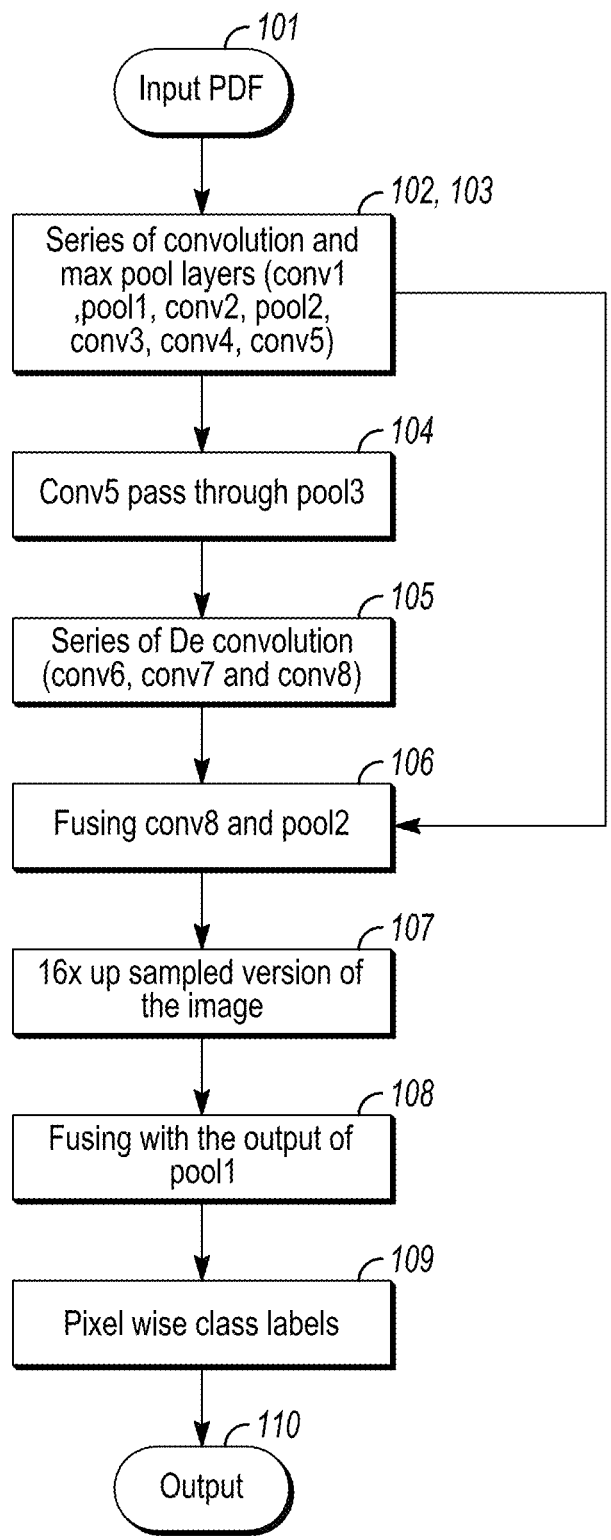
FIG. 3 depicts the flow chart of the neural network architecture employed by the present invention in one embodiment.

FIG. 3 depicts the flow chart of the neural network architecture used by the present invention. The process of extracting the portable document format starts by inputting the PDF document (step-101), then it goes through a series of convolution conv1, conv2, conv3, conv4 and conv5 while creating a maximum pool layer pool1 and pool2 (step-103), resulting in a unique non-linear representation for each local region on the image. The final convolution is then passed through a maximum pool layer pool2 (step-104).

A series of de-convolution operations conv6, conv7, and conv8 (step-105) is then performed to the output of step-104 and the output of the final de convolution is then fused with the maximum pool layer pool2 (step-106) which produces a 16× up sampled version of the image representation (step-107).

To get the pixel wise class labels (step-109), the up sampled version of the image representation is fused with maximum pool layer pool 1 (step-108). The pixel wise class label is the final output (step-110) of the extraction process which classifies the different parts of the table in a PDF document like Non-table text, Table header, Row header, Column header, table footer and table cells.

The network may be trained with a large number of synthetically generated document images. The images are annotated with true class labels. A sample training image and its corresponding annotation is shown in FIG. 4.

FIG. 4 depicts the detection of table and indication of the parts of table using different colors. By way of example, the colours in the annotation represent the following classes:

| Colour | Parts of table |
|---|---|
| Black | Non-table text |
| Red | Table header |
| Green | Row header |
| Blue | Column header |
| Grey | Table footer |
| Pink | Table cells |

Figure 6:
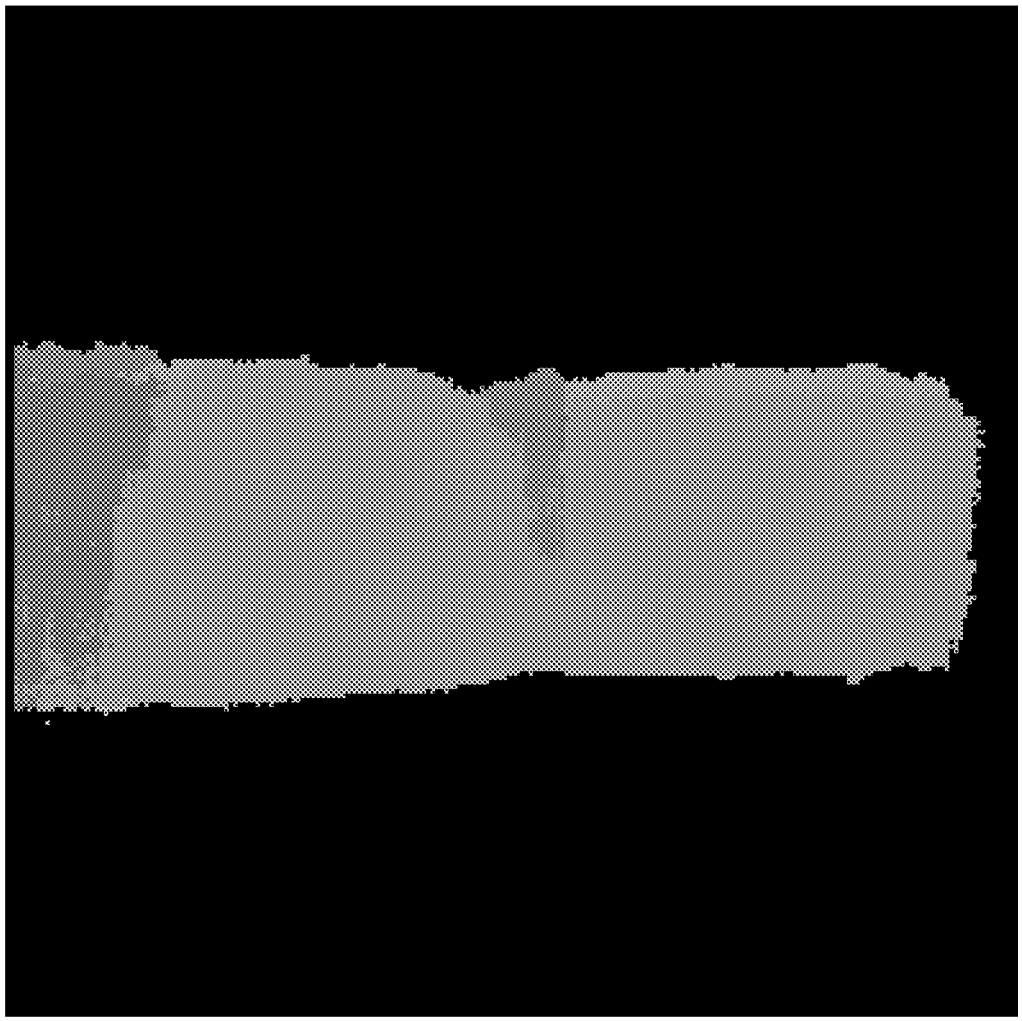
FIG. 6 shows an output with class predictions.
Figure 7:
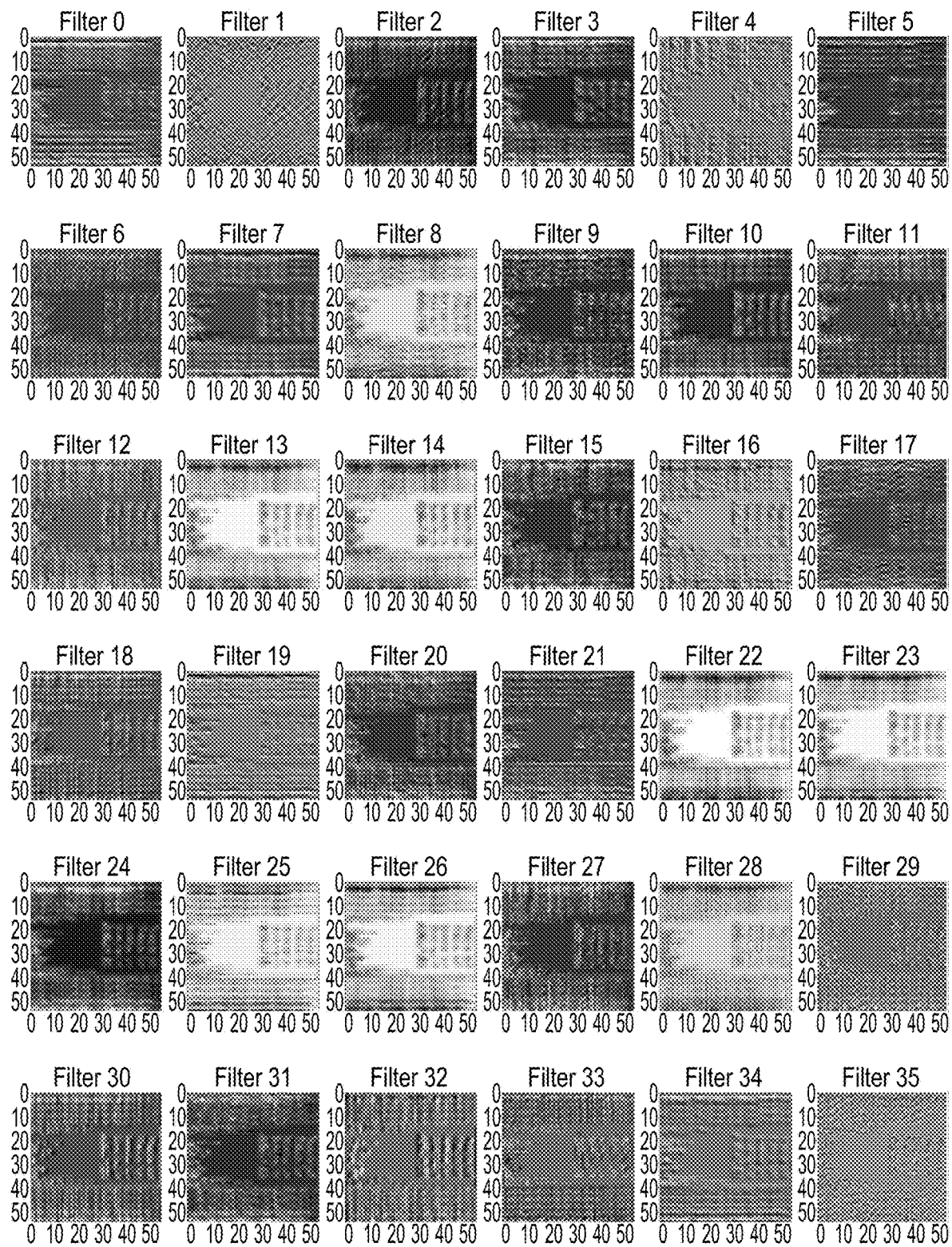
FIGS. 7-9 show the outputs of the convolutional layers conv1, conv2 and conv8 of the network, respectively, with FIG. 4 as the training image.
Figure 8:
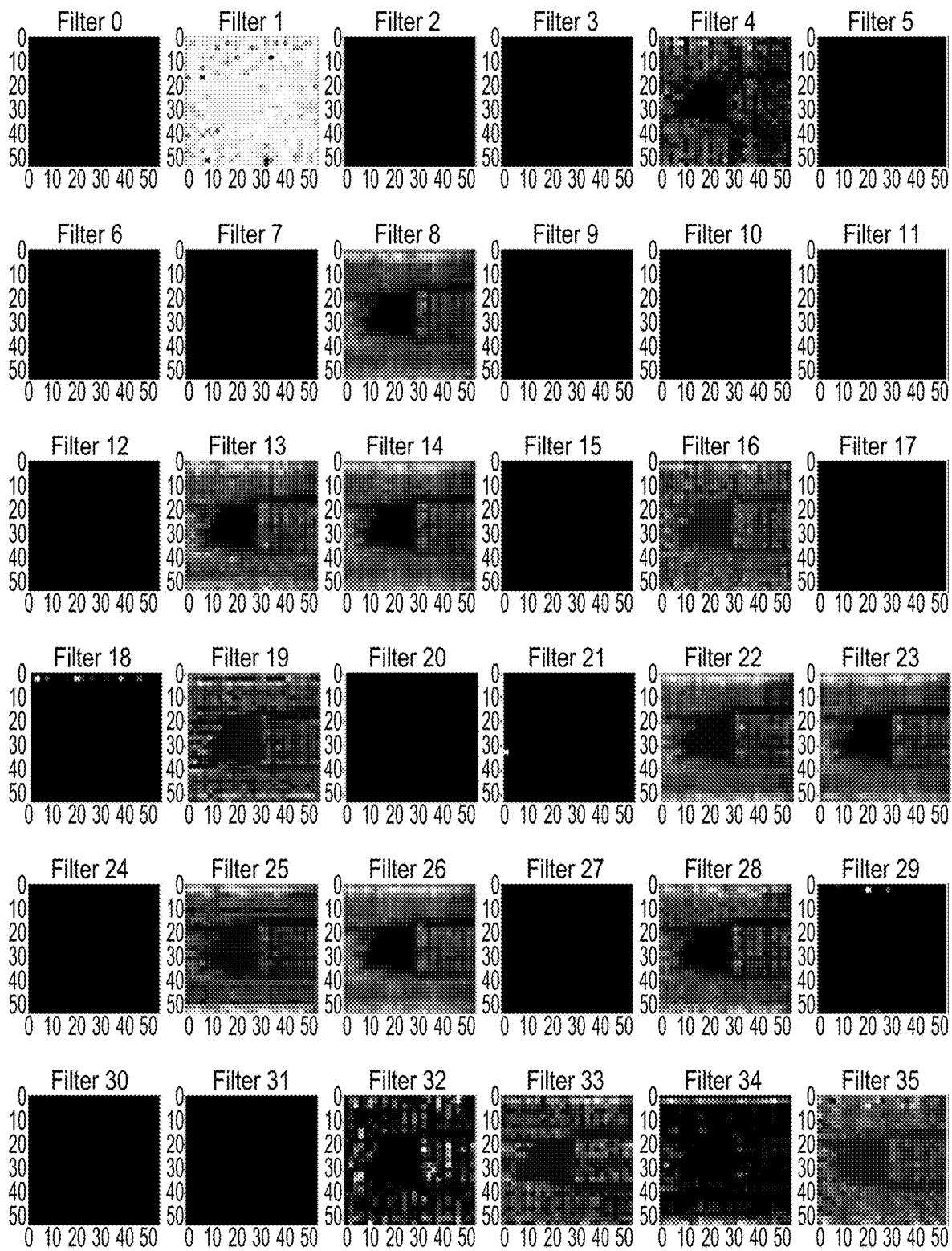
Figure 9:
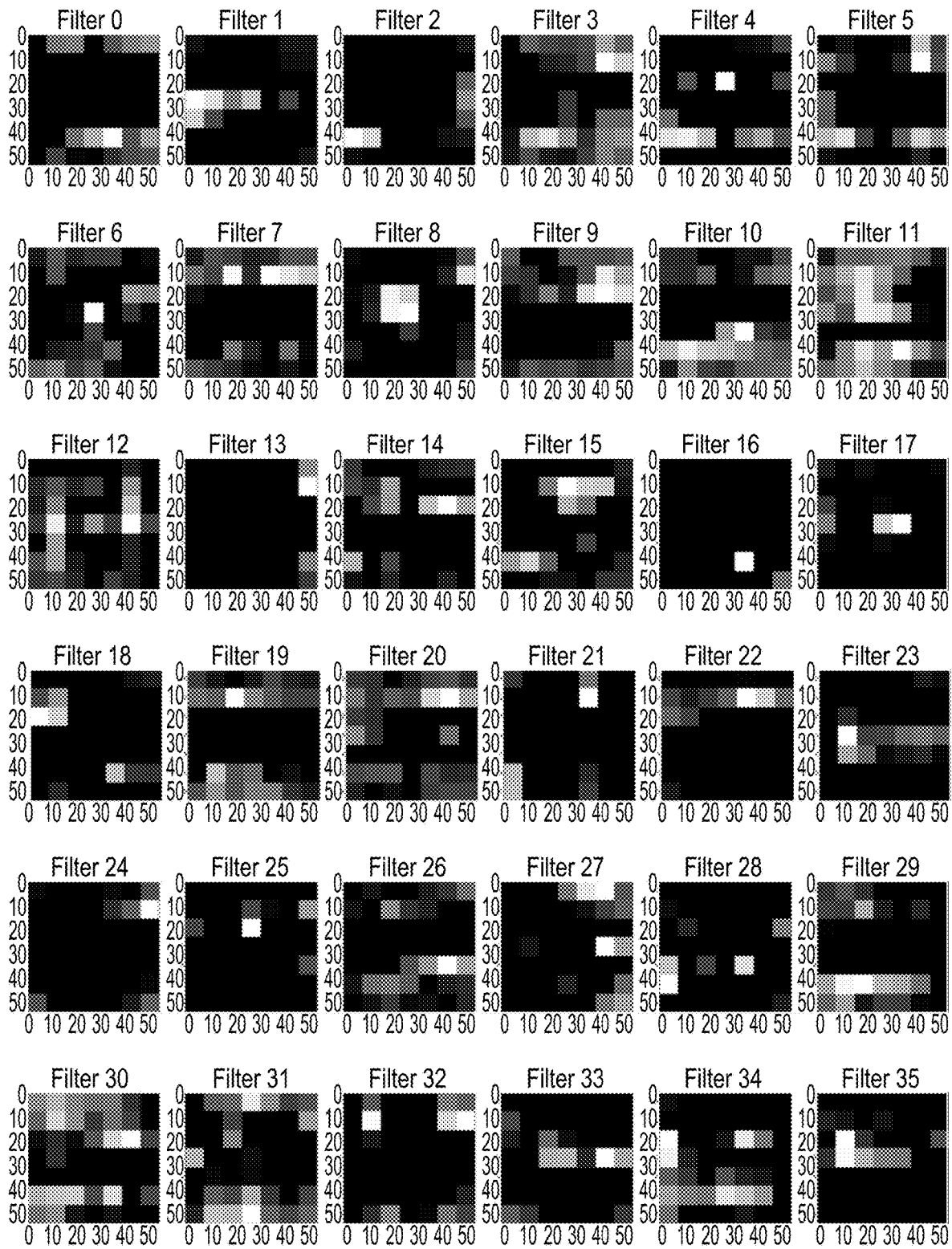
Figure 10:
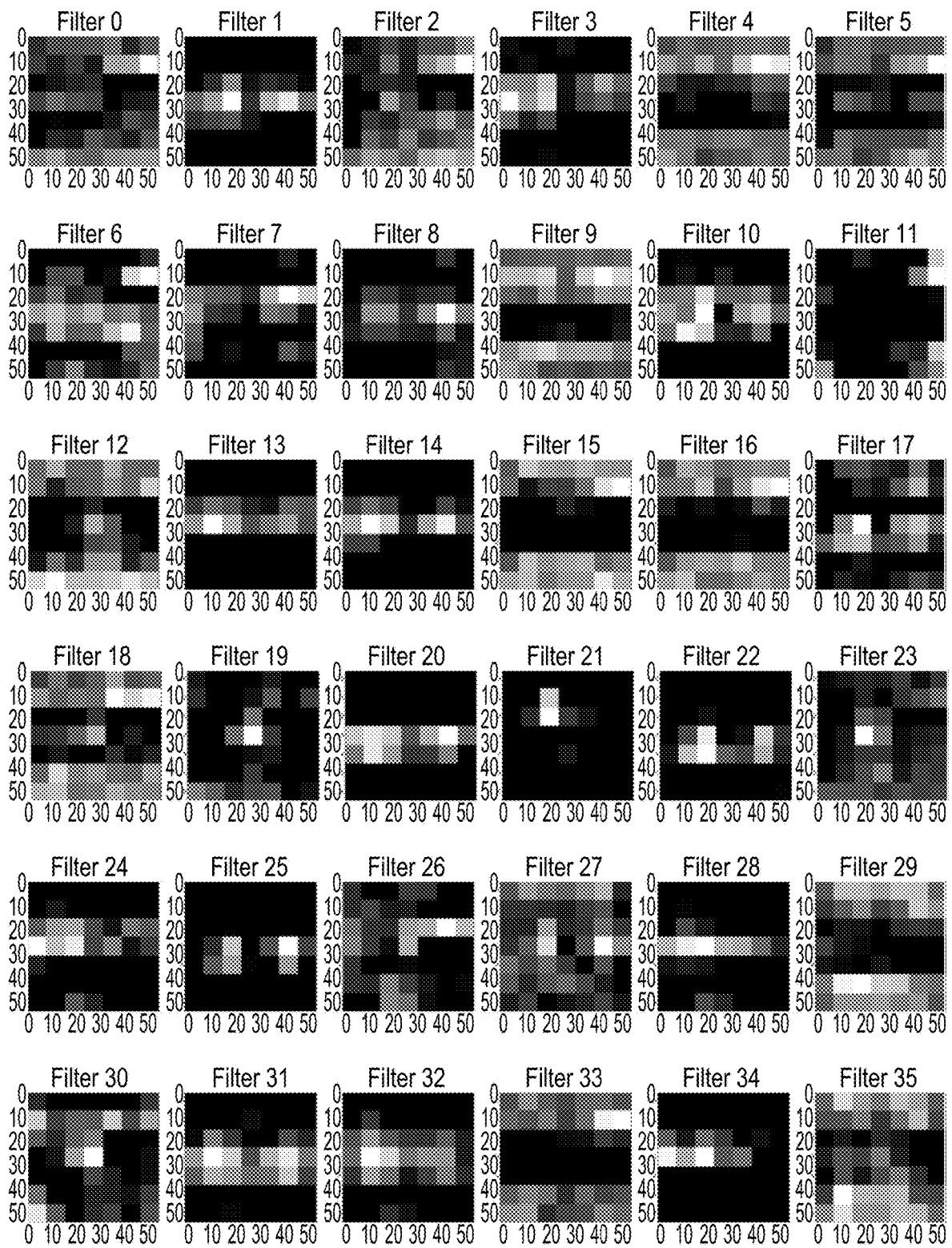
FIGS. 10-11 show subsequent processing of the representation of FIG. 9.
Figure 11:
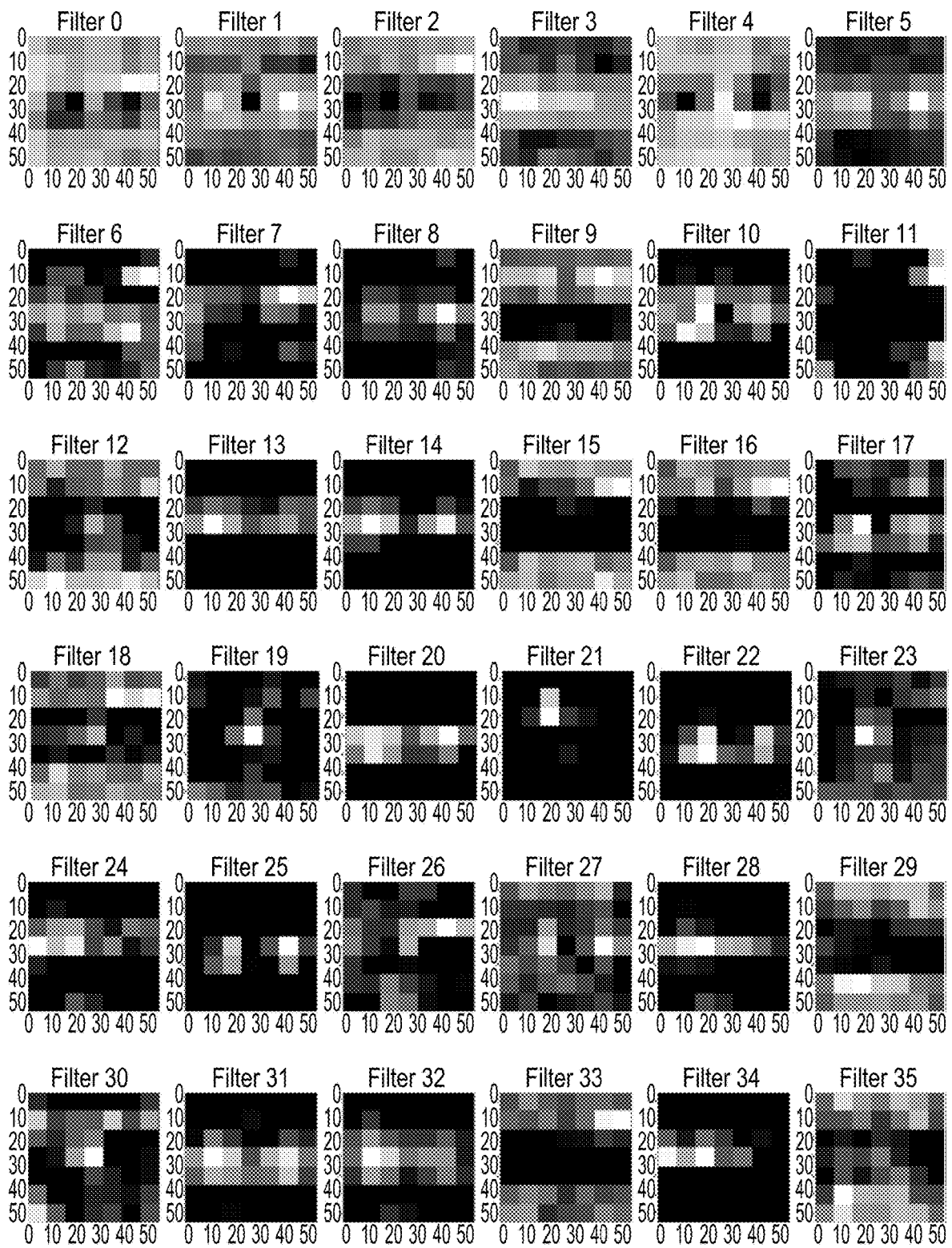

Tens of thousands of such images and their corresponding annotations are input to the deep learning neural network in FIG. 2. FIGS. 7, 8, and 9 show the outputs of the convolutional layers conv1, conv2 and conv8 of the network, respectively, with FIG. 4 as the training image. The layers conv1 and conv2 seem to identify the edges and the regions in the input image. The other convolutional layers similarly encode the information in the image to obtain the final representation shown in FIG. 9. This representation is then input to the fusion layers (deconvolutional layers fused with the pooling layer outputs) to obtain the representations shown in FIGS. 10 and 11, to finally obtain the dense output with the class predictions, as shown in FIG. 6. This predicted output is compared with the true annotation to calculate the loss function, and update the kernel values of the network. This is repeated through multiple iterations until the loss value is minimal, and the prediction and the true annotation images are a close match.

Figure 5:
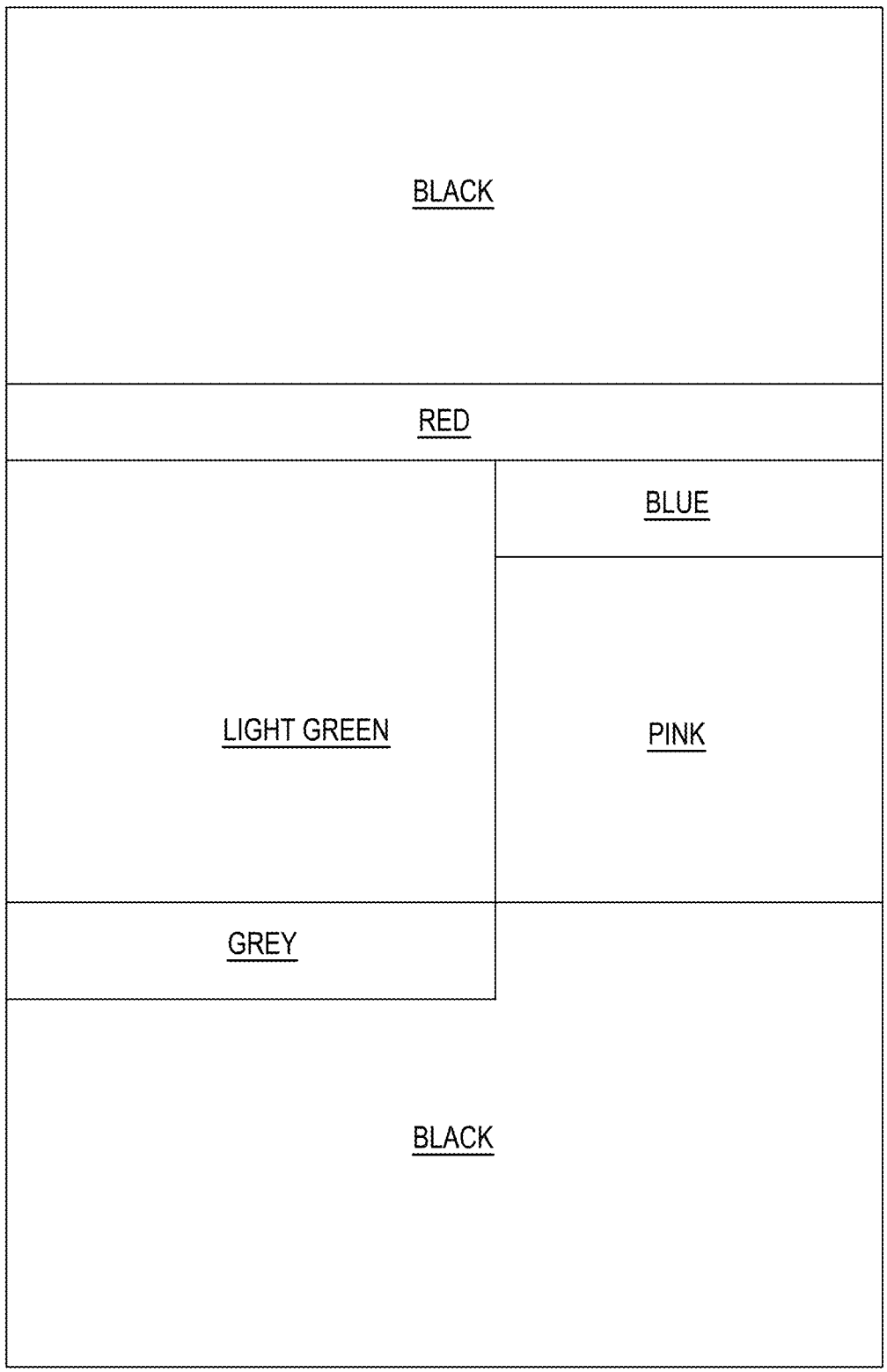
FIG. 5 depicts the indication of the different parts of a table in a PDF document using different colours.

FIG. 5 depicts the indication of the different parts of table in a PDF document using different colours. After obtaining the class predictions for each of the image pixels, the document image can be input to any standard OCR algorithm to extract the text from the image. The text at each pixel is then mapped to the class at the corresponding pixel to extract the text from the table.

Figure 13:
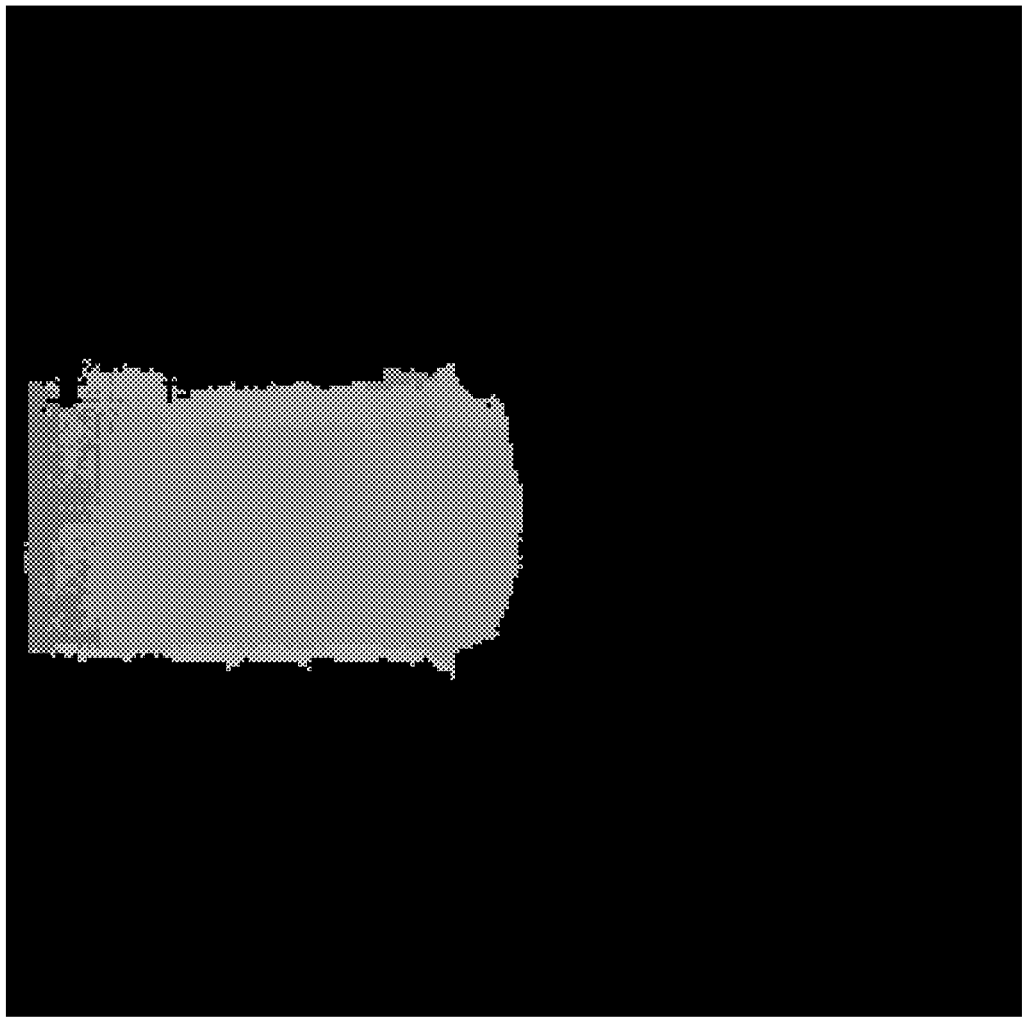
FIGS. 13-17 show the outputs of subsequent processing steps of the example text of FIG. 12.
Figure 14:
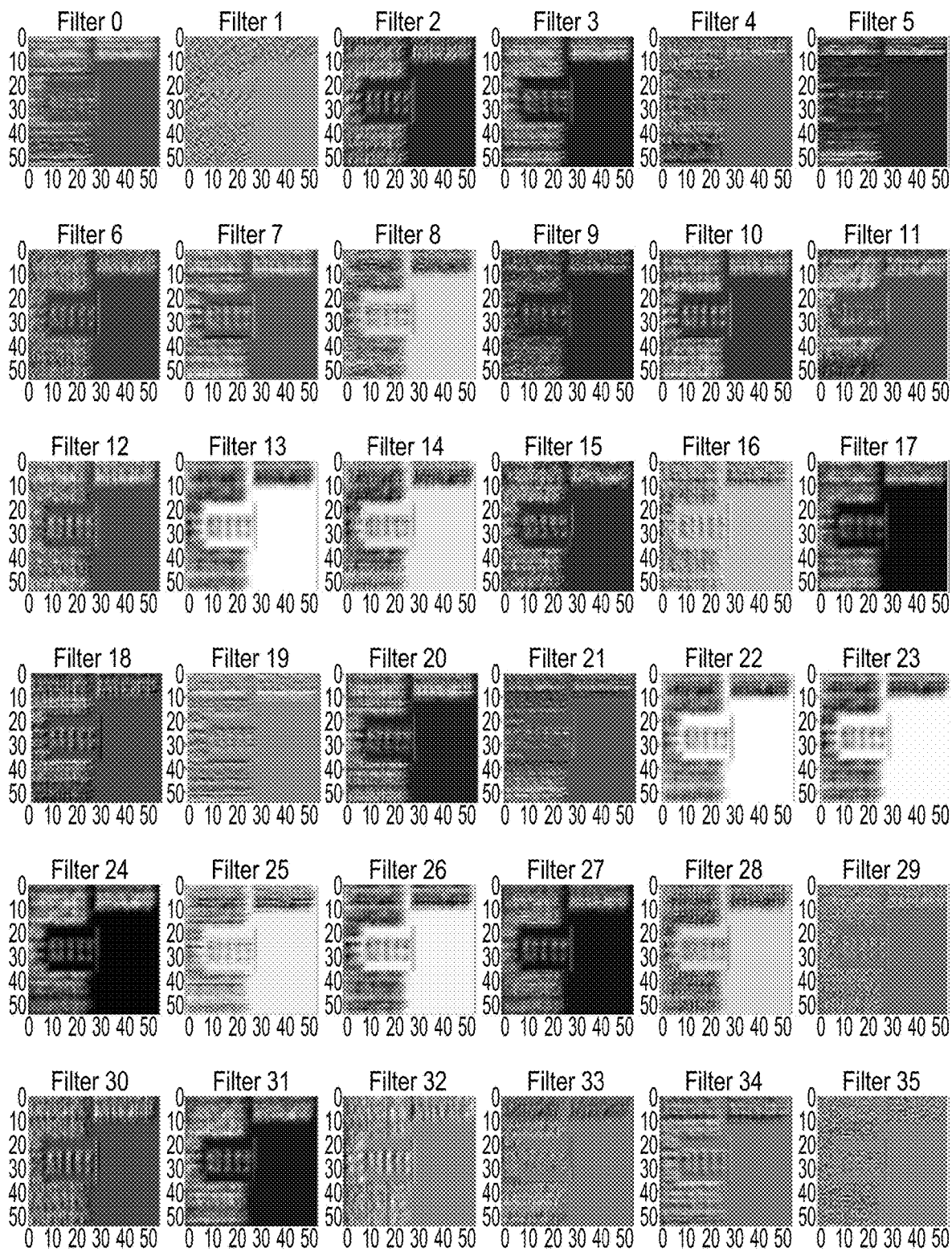
Figure 15:
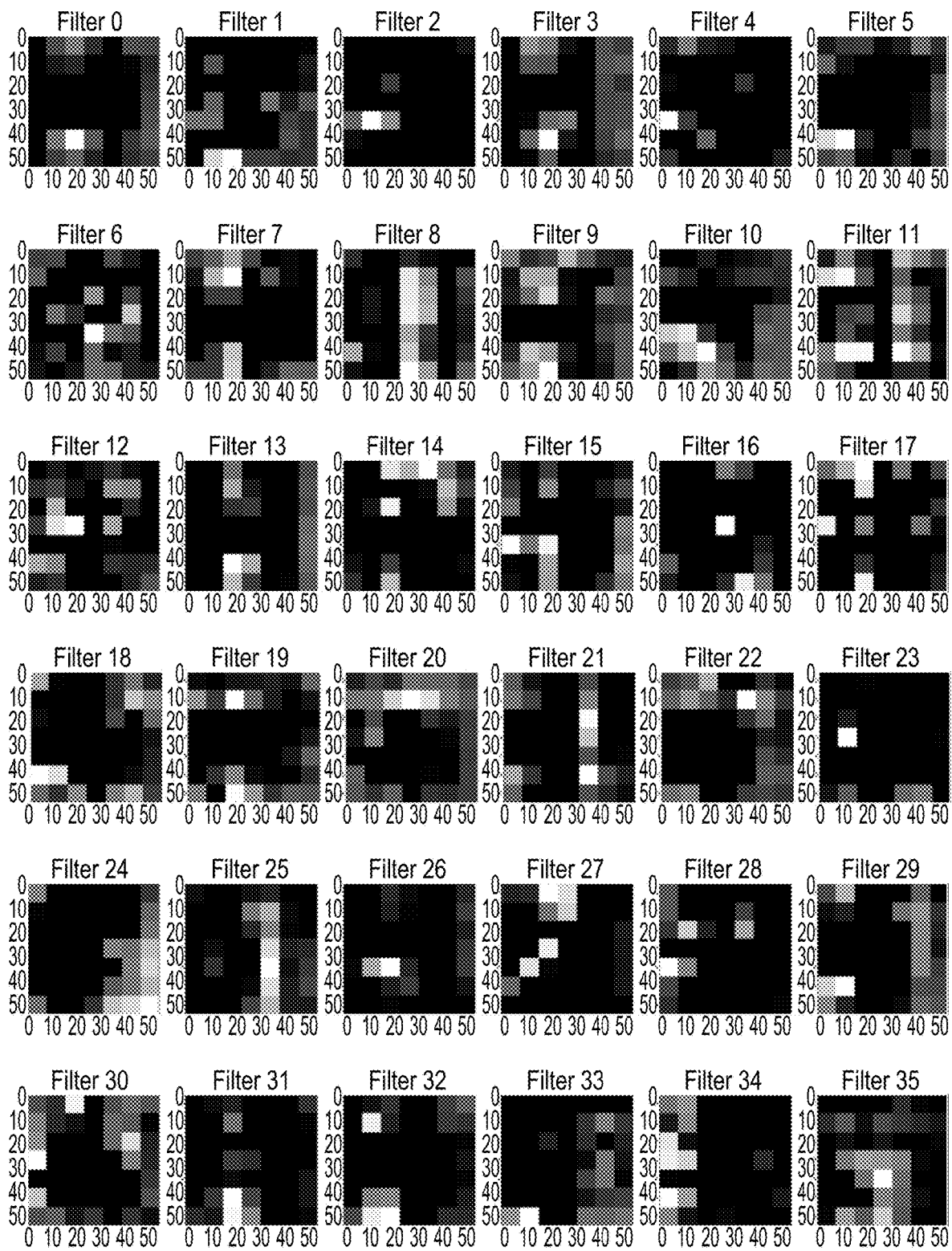
Figure 16:
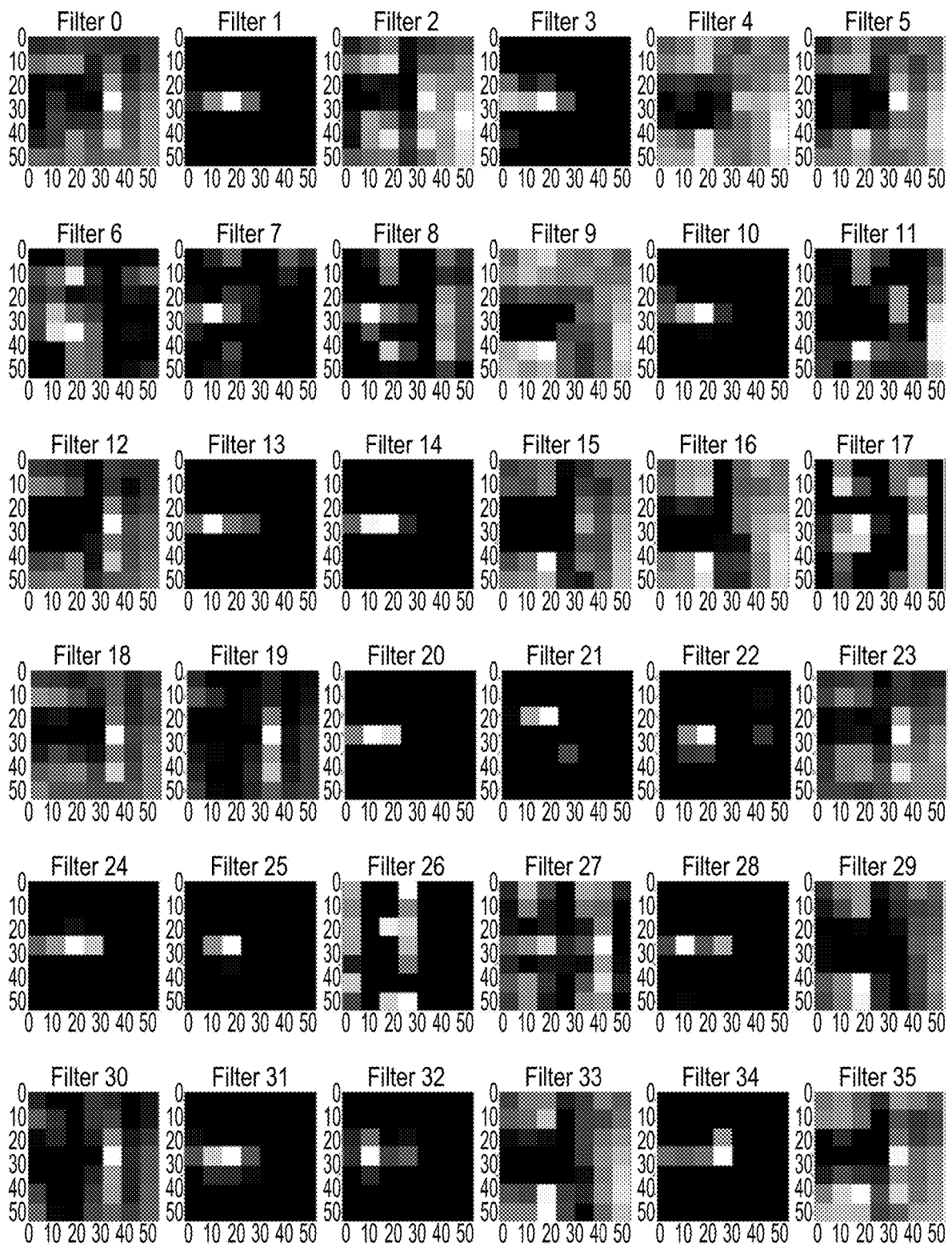
Figure 17:
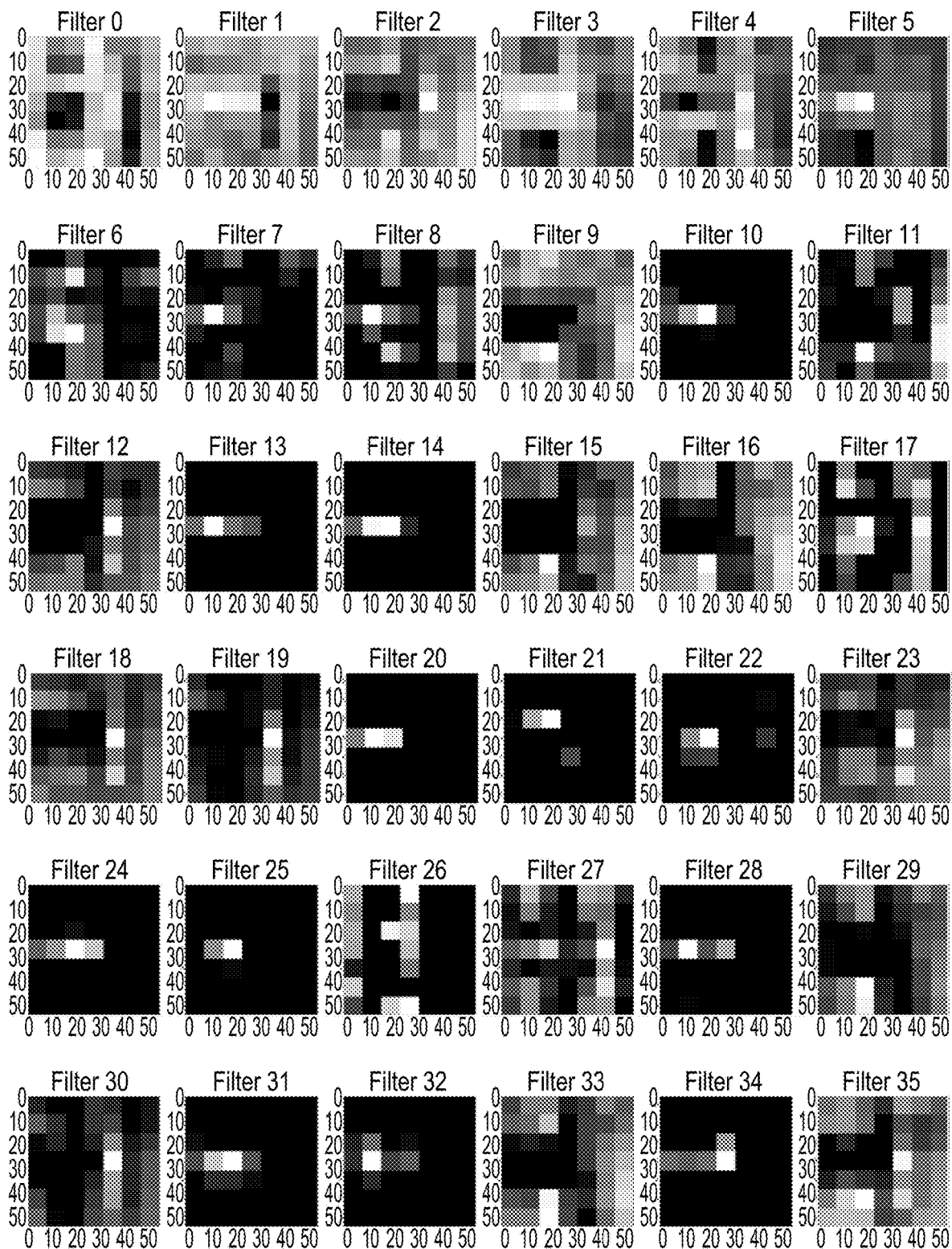

In order to obtain the predictions for a new document, each of the document pages are first converted to individual images. For instance, one such image is shown in FIG. 12. The image is input to the trained network in FIG. 2, to obtain the prediction shown in FIG. 13. The network first produces a unique representation of the image by passing it through the convolutional layers conv1 through conv8 (shown in FIGS. 14 and 15), and then obtains the prediction by passing it through the fusion layers fuse1 and fuse2 (outputs of these layers shown in FIGS. 16 and 17). After obtaining the class predictions for each of the image pixels, the document image can be input to any standard OCR algorithm to extract the text from the image. The text at each pixel is then mapped to the class at the corresponding pixel to extract the text from the table.

It is to be understood that the above description is intended to be illustrative, and not restrictive. For example, the above-discussed embodiments may be used in combination with each other. Many other embodiments will be apparent to those of skill in the art upon reviewing the above description.

The invention claimed is:

1. A method for extracting of data contained in a fixed format electronic document, the method comprising:
    reading, by a computer system, the electronic document as a computer image file;
    segmenting, by said computer system, said computer image file into document sections representative of distinct portions of data;
    applying a label to each distinct document section;
    executing, by said computer system, an optical character recognition algorithm to convert said image file into computer-readable text, wherein segments of said converted text is associated with a respective label indicative of each distinct document section
    training the computer system using a data set of training documents on execution of said segmenting step;
    wherein said training comprises processing said data set through a fully convolutional deep learning neural network configured to label each pixel in the image file, and pixels having a common label and grouped together to define the document sections.

2. The method of claim 1, wherein the data is one or more tables in the fixed format electronic document.

3. The method of claim 2, wherein the document sections include one or more selected from the group consisting of non-table text, table text, table row headers, table column headers, table footers and table cell text.

4. The method of claim 1, wherein the fixed format electronic document is a portable document format (PDF) document containing only image data.

5. The method of claim 4, wherein the image data in the PDF document is of unknown layout.

6. The method of claim 1, wherein each labelled pixel is compared against the known label of the pixel during the training step to determine a loss value; wherein loss values are summed up for each document and the fully convolutional network trained using backpropagation to minimize total loss.

7. A system for extracting of data contained in a fixed format electronic document, the system comprising:
- a computer system processor executing computer readable instructions stored on a non-transitory computer readable medium configured to:
- read the electronic document as a computer image file;
- segment said computer image file into document representative of distinct portions of data;
- apply a label to each distinct document section;
- execute an optical character recognition algorithm to convert said image file into computer-readable text, wherein segments of said converted text is associated with a respective label indicative of each distinct document section;
- wherein the computer readable instructions further include instructions to train the computer system using a data set of training documents on execution of said segmenting step by processing the data set through a fully convolutional deep learning neural network configured to label each pixel in the image file, and pixels having a common label and grouped together to define the document sections.

8. The system of claim 7, wherein the data is one or more tables in the fixed format electronic document.

9. The system of claim 8, wherein the document sections include one or more selected from the group consisting of non-table text, table text, table row headers, table column headers, table footers and table cell text.

10. The system of claim 7, wherein the fixed format electronic document is a portable document format (PDF) document containing only image data.

11. The system of claim 10, wherein the image data in the PDF document is of unknown layout.

12. The system of claim 7, wherein each labelled pixel is compared against the known label of the pixel during the training step to determine a loss value; wherein loss values are summed up for each document and the fully convolutional network trained using backpropagation to minimize total loss.

\* \* \* \* \*